United States Patent
Hoelzel et al.

(10) Patent No.: US 10,155,434 B2
(45) Date of Patent: *Dec. 18, 2018

(54) ROLLER BLIND ARRANGEMENT HAVING DRIVING MEANS FOR LATERALLY GUIDING A ROLLER BLIND WEB

(71) Applicant: WEBASTO SE, Stockdorf (DE)

(72) Inventors: Dominik Hoelzel, Stockdorf (DE); Andreas Rockelmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/580,161

(22) PCT Filed: Apr. 21, 2016

(86) PCT No.: PCT/EP2016/058874
§ 371 (c)(1),
(2) Date: Dec. 6, 2017

(87) PCT Pub. No.: WO2016/198194
PCT Pub. Date: Dec. 15, 2016

(65) Prior Publication Data
US 2018/0154747 A1 Jun. 7, 2018

(30) Foreign Application Priority Data

Jun. 11, 2015 (DE) .................. 10 2015 109 274

(51) Int. Cl.
*B60J 1/20* (2006.01)
*B60J 7/00* (2006.01)
*B60J 7/06* (2006.01)

(52) U.S. Cl.
CPC .......... *B60J 7/0015* (2013.01); *B60J 1/2025* (2013.01); *B60J 1/2027* (2013.01); *B60J 1/2052* (2013.01);
(Continued)

(58) Field of Classification Search
CPC ........ B60J 7/0015; B60J 7/067; B60J 1/2013; B60J 5/08; E06B 9/56; E06B 9/58; E06B 9/851
See application file for complete search history.

(56) References Cited

U.S. PATENT DOCUMENTS 6,691,761 B1 * 2/2004 Alkhoury .................. E06B 9/54
160/273.1
6,899,380 B2 * 5/2005 Kralik .................... B60J 7/0015
160/273.1
(Continued)

FOREIGN PATENT DOCUMENTS

| DE | 102008012202 A1 | 9/2009 | |
| DE | 102013102838 A1 | 9/2014 | |
| JP | 2001055046 A * | 2/2001 | ............ B60J 7/0015 |

OTHER PUBLICATIONS

International Preliminary Report on Patentability issued against International Application No. PCT/EP2016/058874 dated Dec. 12, 2017.
(Continued)

*Primary Examiner* — Katherine W Mitchell
*Assistant Examiner* — Jeremy C Ramsey
(74) *Attorney, Agent, or Firm* — Fitch, Even, Tabin & Flannery, LLP (57) ABSTRACT

A roller blind for shading a transparent vehicle section having a roller blind web which can be wound up to form a roller blind reel and which is guided in a guide rail at each of its lateral edges on either side of a longitudinal center plane of the roller blind, and two driving means, each of which is guided in a guide track of one of the guide rails. Each driving means is formed by a toothed belt which has a substantially rectangular cross-section and a toothing on at least one side whose teeth run at least approximately parallel to the plane of the unwound roller blind web in the trans-
(Continued)

verse direction of the respective guide rail, the roller blind web being pressed between the toothed belt underside having the toothing and a bottom of the guide track and being deflected in the guide track by the toothed belt.

21 Claims, 7 Drawing Sheets

(52) U.S. Cl.
CPC .......... *B60J 1/2061* (2013.01); *B60J 1/2063* (2013.01); *B60J 1/205* (2013.01); *B60J 7/067* (2013.01)

(56) References Cited

U.S. PATENT DOCUMENTS

| | | | |
|---|---|---|---|
| 2010/0288452 A1* | 11/2010 | Coenraets | E06B 9/13 160/309 |
| 2011/0226426 A1* | 9/2011 | Zendath | B60J 7/0015 160/370.22 |
| 2016/0023540 A1* | 1/2016 | Holzel | B60J 1/2027 160/266 |
| 2017/0050499 A1* | 2/2017 | Hoelzel | B60J 1/2027 |

OTHER PUBLICATIONS

International Search Report for PCT/EP2016/058874 dated Aug. 16, 2016 and English translation submitted herewith (5 Pages).
Written Opinion of International Searching Authority and English language translation thereof in PCT/EP2016/058874, 9 pages total, dated Aug. 16, 2016.

\* cited by examiner

ROLLER BLIND ARRANGEMENT HAVING DRIVING MEANS FOR LATERALLY GUIDING A ROLLER BLIND WEB

CROSS-REFERENCE TO RELATED APPLICATIONS

This application is a U.S. national phase application filed under 35 U.S.C. § 371 of International Application No. PCT/EP 2016/058874, filed Apr. 21, 2016, designating the United States, which claims priority from German Patent Application No. 10 2015 109 274.3, filed Jun. 11, 2015, which are hereby incorporated herein by reference in their entirety for all purposes.

FIELD

The invention relates to a roller blind arrangement for an automobile for shading a transparent vehicle section, the roller blind arrangement having the features of the preamble of claim 1.

BACKGROUND

A roller blind arrangement of this kind is known from DE 10 2008 012 202 A1 and comprises a roller blind web capable of being unwound from a winding shaft in order to shade a transparent roof section of the respective automobile and of being wound onto the winding shaft in order to not shade the transparent roof section. At each of its edges arranged laterally with respect to a vertical longitudinal center plane of the vehicle, the roller blind arrangement has a guide rail in which a respective lateral edge of the roller blind web is guided. In this way, the roller blind web can be kept tensioned in the transverse direction of the roller blind web, i.e. in the transverse direction of the vehicle. For actuation, the roller blind arrangement has a driving motor which drives two driving cables, which constitute the driving means of the roller blind web and each of which is guided in a guide rail toward a pull bar arranged at an edge of the roller blind web that faces away from the winding shaft. The driving cables, which are formed by so-called pitch cables and have a substantially round cross-section, simultaneously form lateral guide tapes of the roller blind web, and they do so in that the roller blind web is wrapped around the driving cables by means of a complex deflecting arrangement when entering the guide rail. The driving cables thus dig into the roller blind web via a rough, brush-like surface, which is formed by a plurality of fine bristles. The fact that the roller blind web wraps around the driving cables and the bristles dig into the roller blind web causes high wear of the roller blind web. Moreover, the deflecting arrangement for the roller blind web requires a large amount of constructional effort.

The object of the invention is to provide a roller blind arrangement of the kind mentioned above that allows simultaneous use of driving means as driving elements and as guide elements of the roller blind web at little constructional effort.

This object is attained according to the invention by the roller blind arrangement having the features of claim 1.

According to the invention, the roller blind web is pressed between the undersides of the driving means, which are formed by toothed belts, and the bottoms of the guide tracks or between the upper sides of the driving means and the roofs of the guide tracks within the guide tracks of the guide rails.

The guide tracks are adjusted to the cross-section of the toothed belts and thus have at least one groove section having a rectangular cross-section. This leads to an at least approximately U-shaped or an at least approximately invertedly U-shaped deflection of the roller blind webs within the guide tracks. When the roller blind web enters the guide tracks of the guide rails, the deflection is realized solely by the toothed belts, which enter the guide tracks at the same time and press the roller blind web into the guide tracks. The deflection allows the roller blind web to dig into the toothings, i.e. into the edges of the teeth of the toothings, which ensures that the roller blind web is tightly tensioned transverse to the pulling direction. The toothings of the toothed belts are formed at least on the toothed belt side with which the toothed belts press the roller blind web against the bottoms of the guide tracks or against the roofs of the guide tracks, i.e. on the undersides or on the upper sides of the toothed belts. The toothings of the toothed belts can thus engage directly into the material of the roller blind web and embed themselves there. At the same time, the toothed belts exert a strong retaining force onto the roller blind web. No separate deflecting means, such as guide surfaces or the like, are necessary to deflect the roller blind web into the U-shaped state or into the inverted U-shaped state. Instead, the deflection is realized solely by the force applied by the respective toothed belt from above or from below within the respective guide track of the guide rail. Since, additionally, the degree to which the roller blind web is deflected may be small, i.e. the depth of impression of the roller blind web into the guide track may be small and the material of the roller blind web is always somewhat elastic, crease-free winding-up of the roller blind web into a roller blind reel is ensured, too. Upon actuation, the toothed belts, which constitute the driving means for the roller blind web, can cause the roller blind web to be wound up or unwound, and they can do so at low forces.

Owing to the fabric tension of the roller blind web in the transverse direction of the roller blind, the toothed belts are each subjected to a torque about their respective longitudinal axis. The toothed belts then are supported on the walls of the guide track via their corner surfaces which face in the direction of the torque. In this way, twisting of the toothed belts in the guide tracks is prevented.

The arrangement of the toothings parallel to the plane of the unwound roller blind web allows each of the toothed belts to be deflected in a plane that is at a right angle to the plane of the unwound roller blind web so as to be able to go around any components of the automobile that are arranged in a straight line between the respective guide rail and a driving element for the respective toothed belt without disturbing the driving function. This means that the toothed belts are flexible in a direction that is at a right angle to the plane of the roller blind web, allowing them to be guided around respective components. This, in turn, has the result that the roller blind reel in particular can be arranged in this direction in an optimized manner in terms of installation space and the toothed belts can be guided around the roller blind reel. For example, the roller blind reel can be stored in an installation space of the guide rails and not or only slightly penetrate a rail bottom when the roller blind web is in the wound-up state. This has a positive effect on the maximum headroom realizable in the vehicle interior.

In a preferred embodiment of the roller blind arrangement according to the invention, each toothed belt is driven by means of a driving pinion whose plane is located at least approximately in the plane of the respective toothed belt. The driving pinion can in particular be integrated into an installation space of a guide rail associated with the respective toothed belt or in a front-side attachment of said guide rail. Thus, an elaborate deflection of the of the toothed belt in the transverse direction of the roller blind arrangement is unnecessary, which, in turn, facilitates constructional implementation of the roller blind arrangement according to the invention.

In a specific embodiment of the roller blind arrangement according to the invention, the two driving pinions, each of which drives one of the toothed belts, are driven by a shared driving motor. The driving motor can be coupled to the two driving pinions via rigid or flexible driving shafts.

In an alternative embodiment of the roller blind arrangement according to the invention, each driving pinion is driven by a separate driving motor. In this case, the driving motors are preferably fixed to the guide rails or to front-side attachments of the guide rails, the driving pinions for the toothed belts also being integrated in said attachments.

The arrangement of the toothed belt according to the invention, i.e. the orientation of the teeth of the toothing parallel to the plane of the roller blind web, allows the driving pinions to be variably arranged at different points within the roller blind arrangement. For example, the driving pinions may be arranged on the side of the roller blind reel that faces away from the guide rails, in which case the toothed belts engage over and/or under the roller blind reel. The toothed belts are thus guided past the roller blind reel toward the guide rails in order to there guide the roller blind web in den guide tracks and to engage with the roller blind web.

In an embodiment of the roller blind arrangement according to the invention that consumes little installation space, the driving pinions can be arranged between the roller blind reel and the guide rails. In this case, the toothed belts do not have to be guided around the roller blind reel, which means that no additional installation space has to be reserved for this measure.

In another alternative embodiment of the roller blind arrangement according to the invention, the driving pinions are arranged on the sides of the guide rails that face away from the roller blind reel. In this embodiment, it may be necessary for the toothed belts to be guided around a vehicle component, such as a wind deflector of a roof opening system, in corresponding guide channels, which is made possible by the horizontal arrangement of the toothed belts, i.e. by aligning the toothing of the toothed belts parallel to the plane of the roller blind web.

To ensure proper function of the roller blind arrangement according to the invention, a guide channel for an exiting end of the respective toothed belt is formed on each of the guide rails in an advantageous embodiment of the roller blind arrangement according to the invention.

For example, each guide channel is formed by a guide tube fixed to the respective guide rail. The guide tube can be made of plastic.

In a preferred embodiment of the roller blind arrangement according to the invention, each guide track has a substantially rectangular cross-section which corresponds to the cross-section of the respective toothed belt, the roller blind web being introduced into the guide tracks via a respective lateral slot and being arranged between the respective guide rail and the respective toothed belt, or more precisely its toothing, within the guide tracks.

To be able to realize the at least approximately U-shaped deflection or the invertedly U-shaped deflection of the roller blind web in the guide tracks, the slot is advantageously spaced apart from the bottom or from the roof of the respective guide track, respectively.

The slot via which the roller blind web is introduced into the respective guide track can be spaced apart from both the bottom and the roof of the respective guide track.

In a preferred embodiment of the roller blind arrangement according to the invention, however, the slot is spaced apart either from the bottom or from the roof of the respective guide track and extends as far as to the roof or to the bottom of the respective guide track, respectively.

This means that it is generally conceivable for the guide track, taking into account the opening defined by the slot, to have a circumferential wall that has an at least approximately C-shaped or, in the broadest sense, G-shaped cross-section.

To be able to substantially preclude undesired wedging or catching of an edge portion of the roller blind web, i.e. to improve guiding of the roller blind web in the guide rails, each guide track preferably has a tongue guide at the side that faces away from the slot, edge strips of the roller blind web engaging into said tongue guides.

SUMMARY

For increased flexibility, each toothed belt can have a toothing on each of two sides that face away from each other.

To be able to realize a standardized roller blind web guide for different vehicle types, a specific embodiment of the roller blind arrangement according to the invention has a roller blind web that has a guide tape at each of its lateral edges on either side of the vertical longitudinal center plane of the roller blind, said guide tape being connected to a central portion of the roller blind web and being guided in the respective guide rail. The guide tapes can each constitute a so-called standardized textile module which can be used in roller blind arrangements according to the invention irrespective of the material forming the visible surface of the roller blind web and constituting the central portion. This allows for the same friction parameters to be realized within the guide rails, which are preferably standardized as well.

To keep the structural height of guide rails low and thus to be able to maximize the headroom for passengers of the automobile in question, each toothed belt can have a cross-section whose height/width ratio is less than 1, preferably less than 0.5.

For example, the toothed belts have a height between about 3 mm and about 8 mm, so that the guide tracks of the guide rails can be of a correspondingly low design.

The driving means formed by the toothed belts can each be guided toward a pull bar which is arranged on the edge of the roller blind web that faces away from the roller blind reel. Via the pull bar, which is actuated by the toothed belts and is consequently connected to them, the main pulling force is exerted on the roller blind web when the roller blind web is unwound.

In an advantageous embodiment of the roller blind arrangement according to the invention, the pull bar is provided with a coupling element on each side of the longitudinal center plane of the roller blind, each coupling element being connected to the respective toothed belt.

For example, each coupling element engages into a recess of the respective toothed belt in a form-fitting manner.

Alternatively, the coupling elements can also be molded to the toothed belts by injection molding. In this case, the coupling elements are no longer individual parts; instead, they are integral parts of the toothed belts.

BRIEF DESCRIPTIONS OF THE DRAWINGS

Other advantages and advantageous embodiments of the subject-matter of the invention are apparent from the description, the drawing and the claims.

Examples of embodiments of a roller blind arrangement according to the invention are illustrated in the drawing in a schematically simplified manner and are explained in more detail below.

DETAILED DESCRIPTION

FIGS. 1 to 7 show a roller blind arrangement 10 which is part of a vehicle roof (not illustrated) of a passenger automobile having a roof section that can be closed or at least partially opened by means of a transparent lid element of a roof opening system. The roller blind arrangement 10 serves to at least partially shade the roof section.

The roller blind arrangement 10 comprises a roller blind web 12 made of an opaque fabric capable of being wound up, a fabric edge thereof which extends in the transverse direction of the roof being connected to a winding shaft 14 and being capable of being wound onto the winding shaft 14 so as to not shade the transparent roof section and of being unwound from the winding shaft 14 so as to shade the roof section.

At its free front side, which forms the edge facing away from the winding shaft 14, the roller blind web 12 has a pull bar 16 which extends in the transverse direction of the vehicle, i.e. in the transverse direction of the roller blind, and whose lateral ends are each guided in a sliding manner via a coupling element 18 in a lateral guide rail 20A or 20B, respectively, extending in the longitudinal direction of the roof.

The guide rails 20A and 20B, which extend along the lateral edges of the roof section in the longitudinal direction of the vehicle on either side of a vertical longitudinal center plane of the roof and in the pulling direction of the roller blind web 12 on either side of a vertical longitudinal center plane of the roller blind, can be part of the roof opening system or can be associated with the roller blind arrangement 10 only.

The winding shaft 14 comprises a rotatably mounted winding tube which is pretensioned in the wind-up direction of the roller blind web 12 by means of a winding spring (not illustrated), so that the roller blind web 12 is automatically wound onto the winding shaft 14 to form a roller blind reel when the pull bar 16 is released or when the pull bar 16 is in some way moved in the direction of the winding shaft 14.

For actuation, the roller blind arrangement 10 has an electric driving motor 22 which drives driving pinions 26A and 26B via two rigid or flexible driving shafts 24A and 24B, respectively, each driving pinion 26A and 26B being rotatably mounted in a drive housing 28A and 28B, respectively, on the side of the winding shaft 14 that faces away from the roller blind web 12, the drive housings 28A and 28B being arranged in the guide rails 20A and 20B, respectively. The driving pinions 26A and 26B are each engaged with a plastic toothed belt 30 which constitutes a driving means of the roller blind arrangement 10.

For the sake of clarity, the driving of the roller blind web 12 taking place by means of the plastic toothed belts 30 will be explained with reference to the guide rail 20A and to the components of the roller blind arrangement 10 arranged thereon that are arranged on the left with respect to the direction of forward travel of the vehicle in question only. The guide rail 20B and the components of the roller blind arrangement 10 arranged thereon that are arranged on the right with respect to the direction of forward travel of the vehicle in question are mirror-symmetric thereto and thus readily apparent.

The toothed belt 30 that is engaged with driving pinion 26A has a toothing 32 and 34 on each of two opposite sides. Toothing 32 is engaged with driving pinion 26A. Toothings 32 and 34, which are arranged on the underside and on the upper side of the toothed belt 30, each have teeth, which extend in the transverse direction of the roller blind arrangement 10 parallel to the plane of the roller blind web 12.

Figure 1:
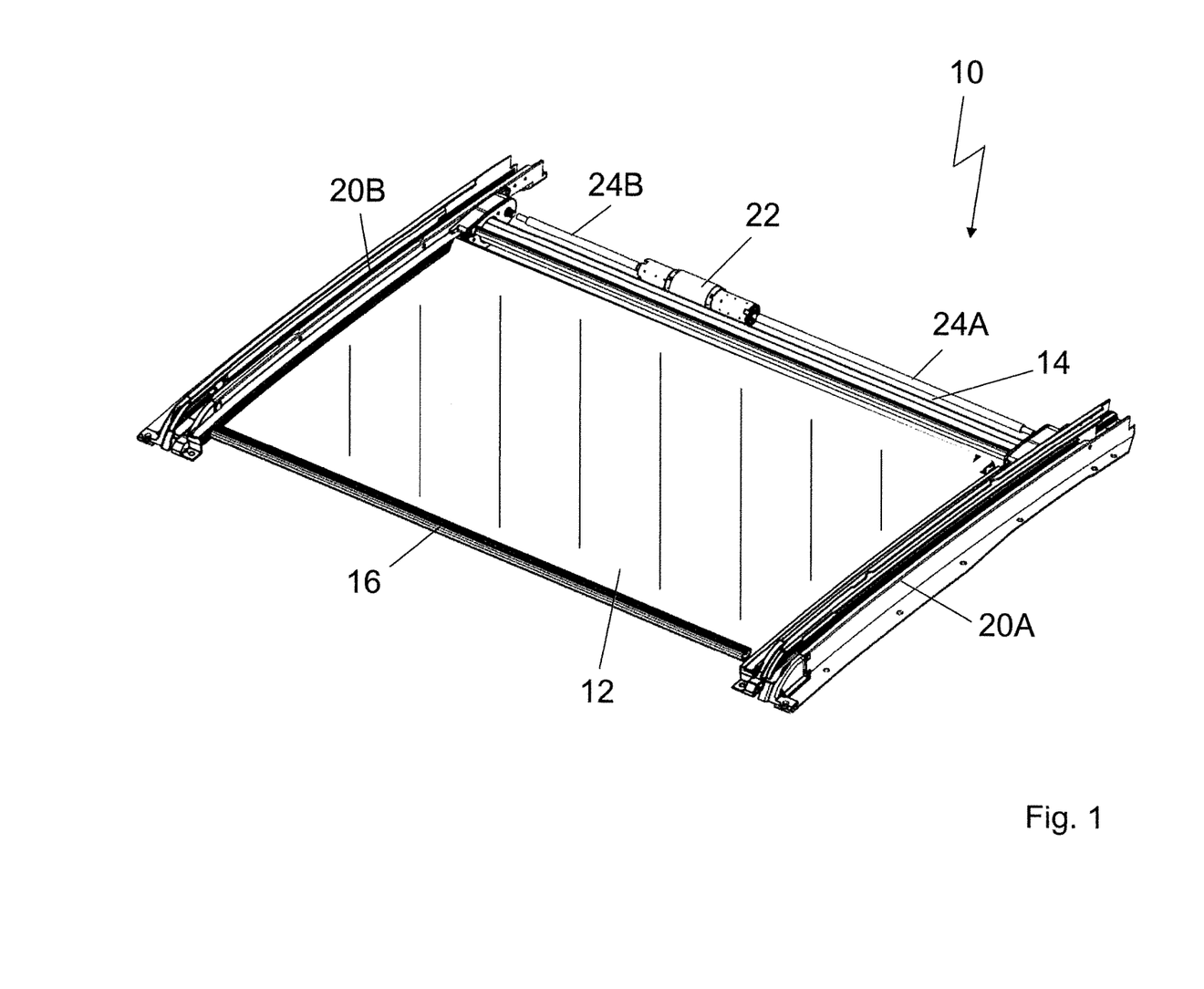
FIG. 1 shows a perspective view of a roller blind arrangement according to the invention with its roller blind web pulled out.
Figure 2:
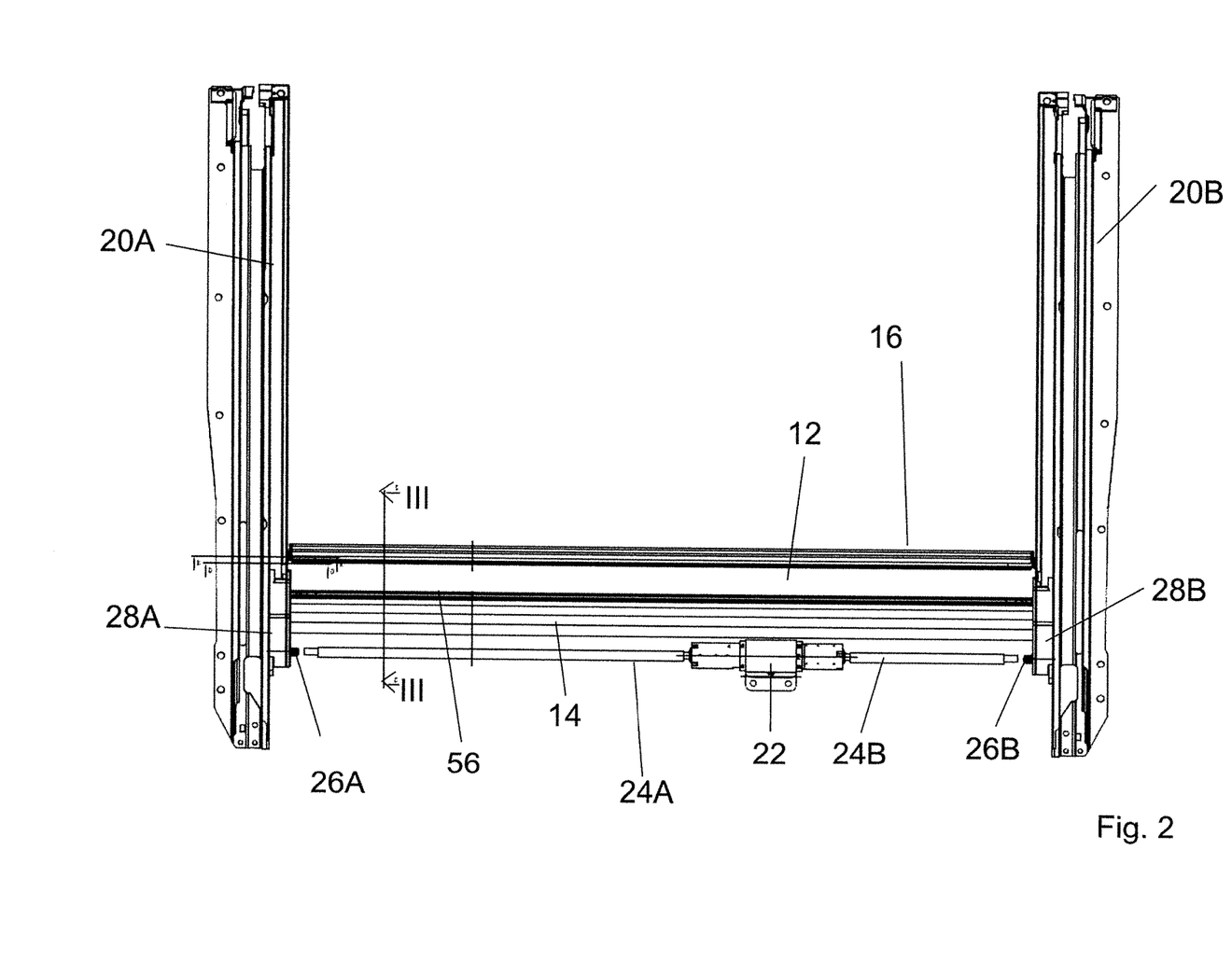
FIG. 2 shows a top view of the roller blind arrangement of FIG. 1, but with the roller blind web wound up.
Figure 3:
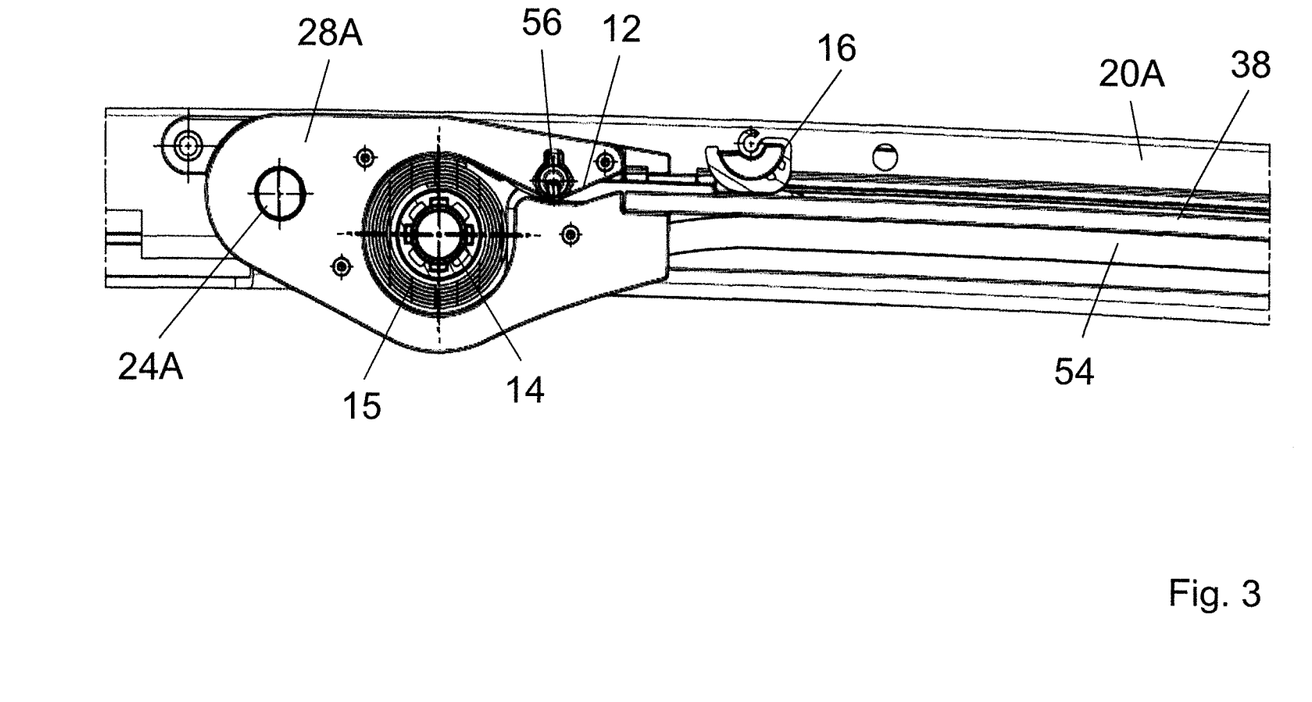
FIG. 3 shows a cross-section through the roller blind arrangement along line in FIG. 2, providing an inside view of a rear-side guide rail section of the roller blind arrangement.
Figure 4:
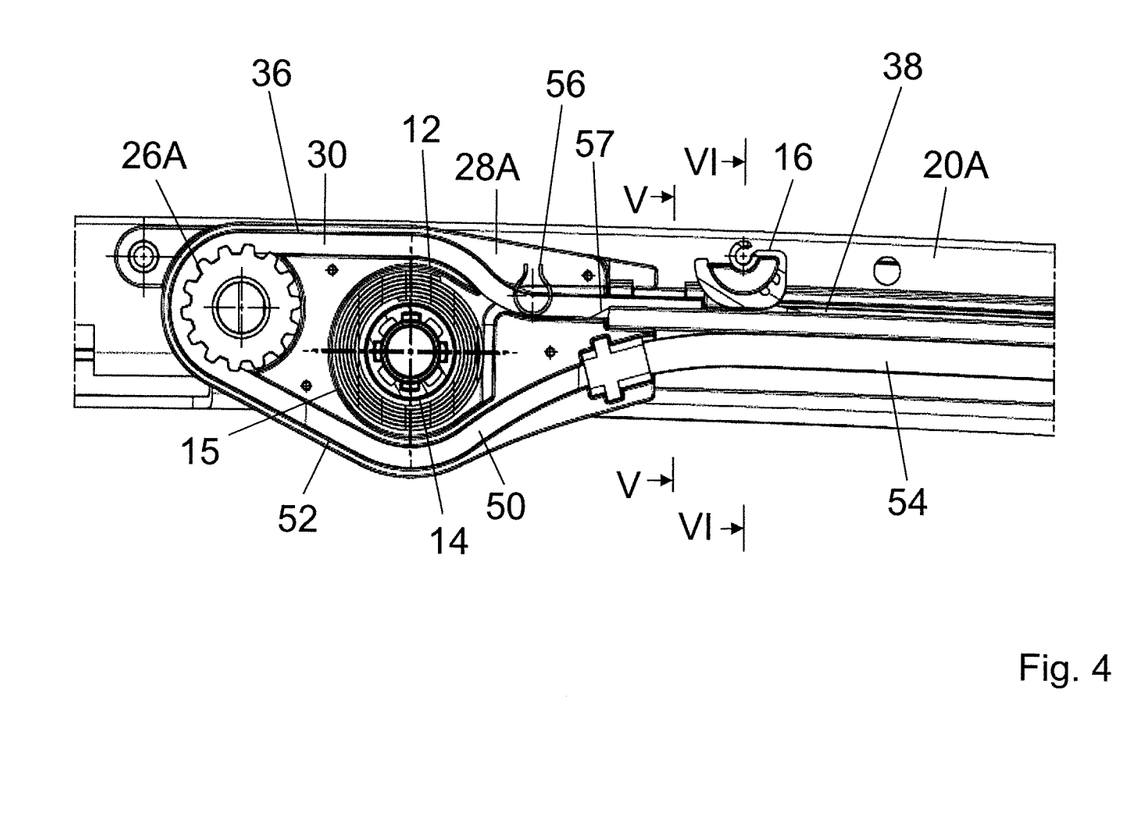
FIG. 4 shows a view corresponding to FIG. 3, but without an inner lid of a drive housing.

As can be seen in particular from FIG. 4, the toothed belt 30 is guided in a guide channel 36 formed by the drive housing 28A and engaging over the roller blind reel 15 formed by the roller blind web 12 toward a guide track 38 of the guide rail 20A, in which it is guided to the pull bar 16. There, the toothed belt 30 is fixed to the coupling element 18 of the pull bar 16.

Figure 5:
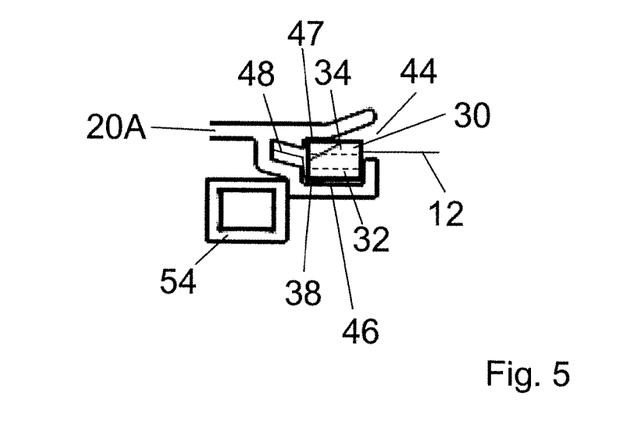
FIG. 5 shows a cross-section through a guide rail along line V-V in FIG. 4.
Figure 6:
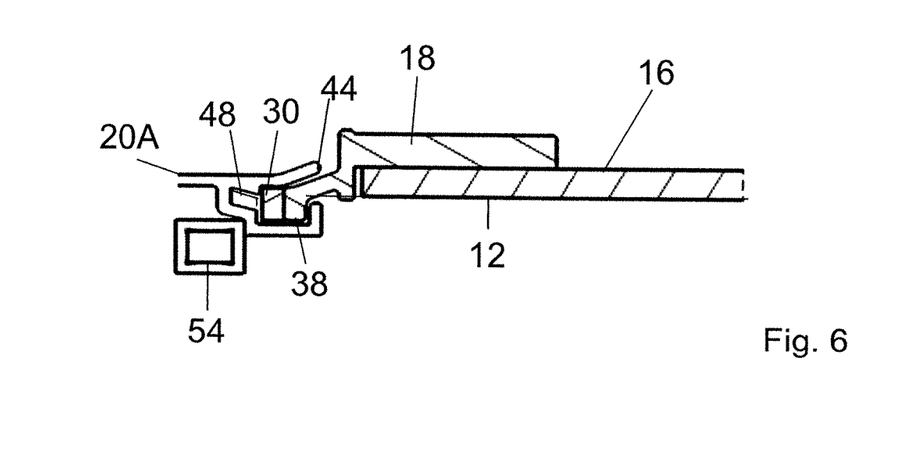
FIG. 6 shows a cross-section through the guide rail along line VI-VI in FIG. 4.
Figure 7:
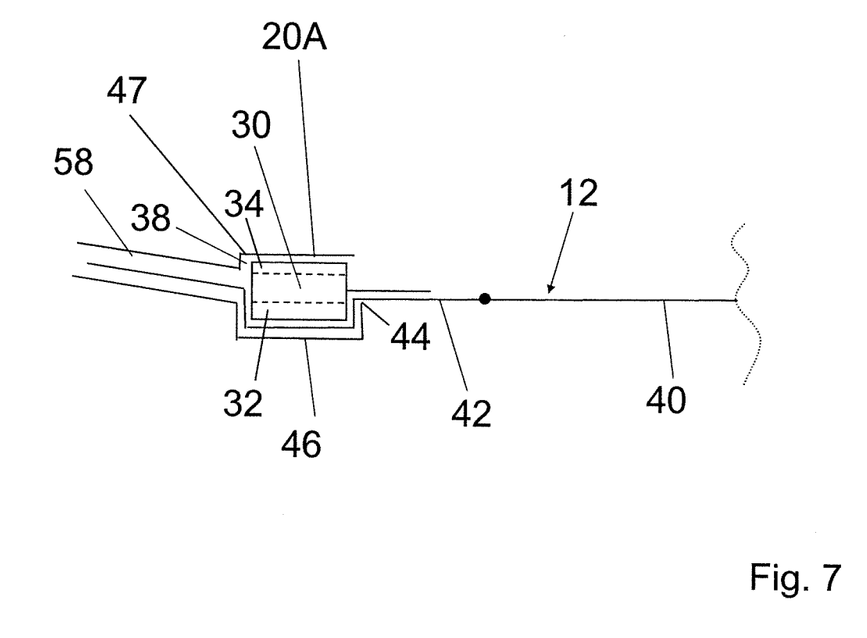
FIG. 7 shows a schematic illustration of an operating principle for guiding a roller blind web of the roller blind arrangement in the guide rail.

As can be seen in particular from FIGS. 5 and 7, the toothed belts 30 each have a substantially rectangular cross-section which corresponds to the substantially rectangular cross-section of the respective guide track 38 of the respective guide rail 20A or 20B.

The roller blind web 12 comprises a central portion 40, which forms its visible surface. At its edges arranged on either side of the vertical longitudinal center plane of the roller blind arrangement 10, the central portion 40 is provided with a guide tape 42 on each side, which constitutes a so-called textile module which can be standardized in connection with the guide rails 20A and 20B. Via the guide tapes 42, the roller blind web 12 is guided in the guide rails 20A and 20B. For this purpose, the guide tapes 42 each engage into the respective guide track 38 of the respective guide rail 20A or 20B, said guide track 38 having a cross-section that is G-shaped in the broadest sense, via a slot 44 that extends in the longitudinal direction of the rail and is spaced apart from a bottom 46 of the guide track 38 at its bottom side and reaches up to a roof 47 of the guide track 38 at its upper side. In the guide track 38, the guide tape 42 is deflected in an at least approximately U-shaped manner in the transverse direction of the roof, i.e. as illustrated in the cross-section of FIG. 7, causing the guide tape 42 of the roller blind web 12 to be pressed between the toothing 32 arranged at the underside of the toothed belt 30 and the bottom 46 of the guide track 38. When the roller blind web 12 is unwound from the winding shaft 14, the guide tapes 42 entering the guide tracks 38 of the guide rails 20A and 20B undergo the at least approximately U-shaped deflection solely because of the toothed belts 30, which enter the guide tracks 38 of the guide rails 20A and 20B at the same time, without using any additional deflection means. On the winding shaft 14, the roller blind web 12 including its guide tapes 42 is wound up without creases. This is ensured by the elasticity of the material of the guide tapes 42, for example.

On the side of the guide track 38 that faces away from the slot 44, i.e. downstream of the U-shaped deflection, a free edge portion of the guide tape 42 of the roller blind web 12 extends into a tongue guide 48, which can be considered a guide track for the free edge strip of the guide tape 42 and which extends or is formed along the length of the respective guide rail 20A or 20B.

The U-shaped deflection of the guide tape 42 of the roller blind web 12 in the guide track 38 of the guide rail 20A allows the roller blind web 12 to dig into the toothing 32 arranged on the underside of the toothed belt 30 and engaging into the material or fabric of the guide tape 42. In this way, strong retaining forces can be exerted, which permit a wind-blocker function of the roller blind arrangement 10, for example. There is no need for retaining bristles or the like on the toothed belt 30. In fact, the toothed belt 30 is bristle-free.

As can be seen in particular from FIGS. 5 and 7, the toothed belts 30 are arranged horizontal with respect to their cross-section, i.e. the height/width ratio is less than 1, in the present case about 0.7. Owing to the toothings 32 and 34 arranged on the upper side and on the underside of the toothed belt 30, the toothed belt 30 is flexible in a plane which is flush with the plane of driving pinion 26A and which extends in the longitudinal and vertical direction of the vehicle.

On the driven side with respect to driving pinion 26A, an exiting end 50 of the toothed belt 30 is guided in a guide groove 52 of the drive housing 28A, the guide groove 52 engaging under the roller blind reel 15, toward a guide tube 54 attached to the guide rail 20A below and to the side of the guide track 38 and is made of plastic.

To ensure that the roller blind web 12 enters the guide track 38 of the guide rail 20A with low friction, the drive housing 28A additionally has an entry slope 57 which is guided toward the lower edge of the lateral slot 44 of the guide track 38.

When the roller blind web 12 is unwound from the winding shaft 14, it additionally runs under a hold-down device 56, which is also fixed to the bilaterally arranged drive housings 28A and 28B and which is curved in the transverse direction of the vehicle.

Figure 8:
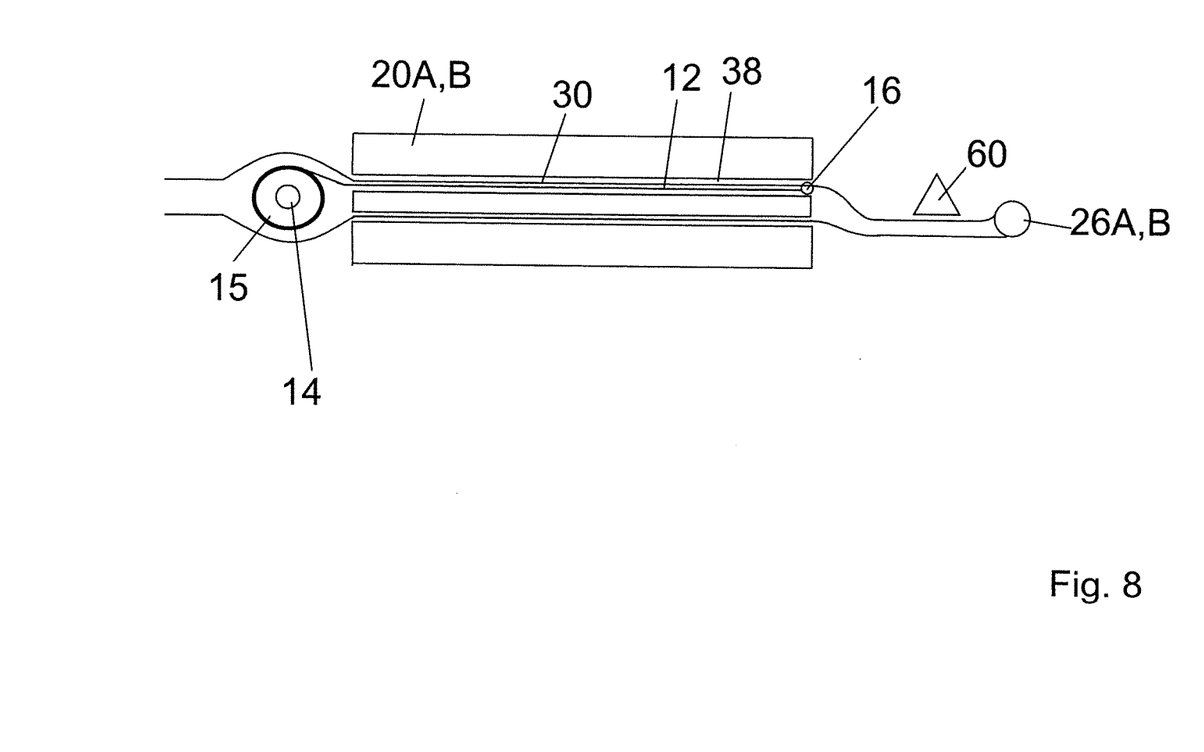
FIG. 8 shows a schematic illustration of a second embodiment of a roller blind arrangement according to the invention.

In FIG. 8, an alternative embodiment of a roller blind arrangement according to the invention is illustrated in a highly schematic manner.

Similarly to the embodiment according to FIGS. 1 to 7 described above, the roller blind arrangement according to FIG. 8 has a roller blind web 12 that is capable of being wound onto and unwound from a corresponding winding shaft 14. Moreover, the lateral edges of the roller blind web 12 that are arranged on either side are correspondingly guided in guide rails 20A and 20B, which are fixed to the roof, the guiding being realized again by means of a toothed belt 30 which is arranged horizontal in terms of its cross-section and which is guided in a guide track 38 of a guide rail 20A or 20B. The guiding is realized by means of a toothed belt 30, which is also guided in the corresponding guide track 38, where the roller blind web 12 is deflected by the toothed belt 30 in a U-shape. On both its upper side and its underside, the toothed belt 30 has a toothing which is engaged with the roller blind web 12 within the guide track 38.

However, the embodiment illustrated in FIG. 8 differs from the embodiment illustrated in FIGS. 1 to 7 in that the toothed belt 30 is driven by a driving pinion 26A and 26B, which is arranged on the side of the guide rail 20A and 20B, respectively, that faces away from the winding shaft 14. Consequently, the driving pinions 26A and 26B are each arranged in the direction of the vehicle front relative to the roof opening to be shaded. Moreover, the driving pinions 26A and 26B are each arranged in the direction of the vehicle front relative to a wind deflector 60, the toothed belt 30 being deflected in the vertical direction of the vehicle at both its driving side and its exiting end by corresponding guide grooves or guide channels, the toothed belt 30 thus engaging under the wind deflector 60. Moreover, the toothed belt 30 engages over and under the winding shaft 14.

REFERENCE SIGNS 10 roller blind arrangement
12 roller blind web
14 winding shaft
15 roller blind reel
16 pull bar
18 coupling element
20A, B guide rail
22 driving motor
24A, B driving shaft
26A, B driving pinion
28A, B drive housing
30 toothed belt
32 toothing
34 toothing
36 guide channel
38 guide track
40 central portion
42 guide tape
44 slot
46 bottom
47 roof
48 tongue guide
50 exiting end
52 guide groove
54 guide tube
56 hold-down device
57 entry slope
60 wind deflector

The invention claimed is:

1. A roller blind arrangement for an automobile for shading a transparent vehicle section, comprising
a roller blind web capable of being wound up to form a roller blind reel and guided in a guide rail at each of its lateral edges on either side of a longitudinal center plane of the roller blind, and
two driving devices, each of which is guided in a guide track of a respective one of the guide rails,
wherein each driving device is formed by a toothed belt which has a substantially rectangular cross-section and a respective toothing having teeth on at least one side,
wherein the teeth run at least approximately parallel to a plane of the unwound roller blind web in a transverse direction of the respective guide rail, the roller blind web being pressed between each toothed belt underside having the respective toothing and a bottom of each respective guide track and being deflected in each respective guide track by the toothed belt at least approximately in a U-shape when viewed in the transverse direction of the guide rail, or the roller blind web being pressed between each toothed belt upper side having the respective toothing and a roof of each respective guide track and being deflected in the guide track by the toothed belt at least approximately in an inverted U-shape when viewed in the transverse direction of the guide rail.

2. The roller blind arrangement according to claim 1, wherein each toothed belt is driven by a respective driving pinion.

3. The roller blind arrangement according to claim 2, wherein the two driving pinions are driven by a shared driving motor.

4. The roller blind arrangement according to claim 3, wherein the driving motor is coupled to the driving pinions via rigid or flexible driving shafts.

5. The roller blind arrangement according to claim 2, wherein each driving pinion is driven by a separate driving motor.

6. The roller blind arrangement according to claim 2, wherein the driving pinions are each arranged on a respective side of the roller blind reel that faces away from a respective one of the guide tracks and the toothed belts engage over and under the roller blind reel.

7. The roller blind arrangement according to claim 2, wherein the driving pinions are arranged between the roller blind reel and the guide rails.

8. The roller blind arrangement according to claim 2, wherein the driving pinions are arranged on a side of the guide tracks that faces away from the roller blind reel.

9. The roller blind arrangement according to claim 1, wherein a guide channel for an exiting end of each respective toothed belt is formed on each of the guide rails.

10. The roller blind arrangement according to claim 9, wherein each guide channel is formed by a guide tube attached to the respective guide rail.

11. The roller blind arrangement according to claim 1, wherein each guide track has a substantially rectangular cross-section which corresponds to the cross-section of the respective toothed belt and that the roller blind web is introduced into the guide tracks by way of a respective lateral slot and is arranged between the respective guide rail and the respective toothed belt within the guide tracks.

12. The roller blind arrangement according to claim 11, wherein each slot is spaced apart from the bottom or from the roof of the respective guide track.

13. The roller blind arrangement according to claim 11, wherein each slot is spaced apart from the bottom of the respective guide track and extends as far as to the roof of the respective guide track or that each slot is spaced apart from the roof of the respective guide track and extends as far as to the bottom of the respective guide track.

14. The roller blind arrangement according to claim 12, wherein the guide tracks each have a respective tongue guide at the side that faces away from the respective slot, a respective edge strip of the roller blind web engaging into each tongue guide.

15. The roller blind arrangement according to claim 1, wherein each toothed belt has a toothing on each of two sides that face away from each other.

16. The roller blind arrangement according to claim 1, wherein the roller blind web has a guide tape at each of its lateral edges on either side of the longitudinal center plane of the roller blind, each guide tape being connected to a central portion of the roller blind web and being guided in the respective guide rail.

17. The roller blind arrangement according to claim 1, wherein each toothed belt has a cross-section whose height/width ratio is less than 0.5.

18. The roller blind arrangement according to claim 1, wherein each toothed belt is guided toward a pull bar which is arranged at an edge of the roller blind web that faces away from the roller blind reel.

19. The roller blind arrangement according to claim 18, wherein the pull bar is provided with a coupling element on either side of the longitudinal center plane of the roller blind, each coupling element being connected to the respective toothed belt.

20. The roller blind arrangement according to claim 19, wherein each coupling element engages into a recess of the respective toothed belt in a form-fitting manner.

21. The roller blind arrangement according to claim 19, wherein each coupling element is molded to the respective toothed belt by injection molding.

* * * * *